July 20, 1943.　　　T. G. BOLDIZZONI　　　2,324,673
MACHINE FOR PRESSING GLOVES
Filed Dec. 23, 1942　　　3 Sheets-Sheet 1

INVENTOR
Teobaldo G. Boldizzoni
BY
ATTORNEY

July 20, 1943.  T. G. BOLDIZZONI  2,324,673
MACHINE FOR PRESSING GLOVES
Filed Dec. 23, 1942  3 Sheets-Sheet 2

INVENTOR
Teobaldo G. Boldizzoni
BY
ATTORNEY

July 20, 1943.   T. G. BOLDIZZONI   2,324,673
MACHINE FOR PRESSING GLOVES
Filed Dec. 23, 1942   3 Sheets-Sheet 3
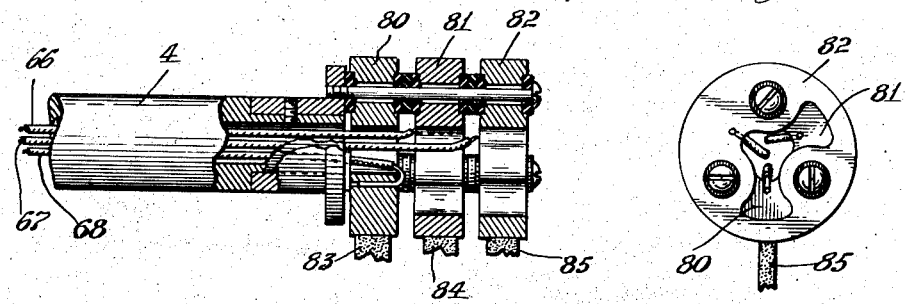
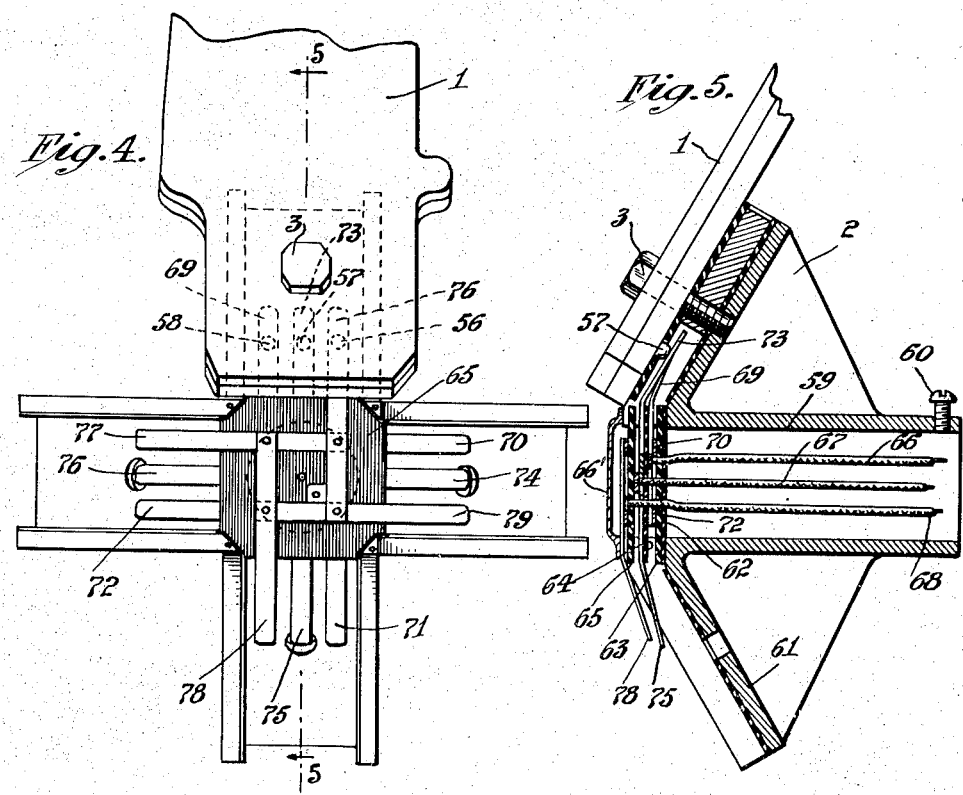
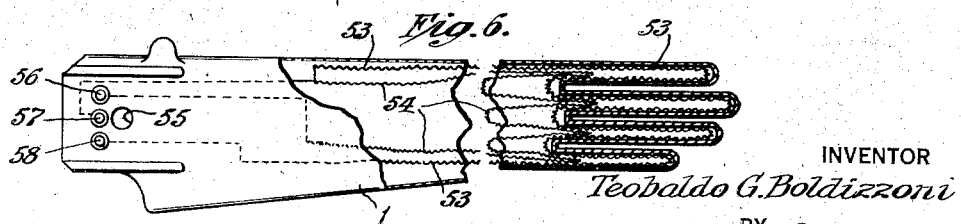
INVENTOR
Teobaldo G. Boldizzoni
BY
ATTORNEY Patented July 20, 1943

2,324,673

UNITED STATES PATENT OFFICE 2,324,673

MACHINE FOR PRESSING GLOVES

Teobaldo G. Boldizzoni, New York, N. Y.

Application December 23, 1942, Serial No. 469,910

8 Claims. (Cl. 223—57)

This invention relates to new and useful improvements in machines for pressing gloves.

In my prior patent, No. 2,186,192, I have described a pressing machine in which gloves are mounted on rotating forms and are stripped therefrom by means of two continuously rotating belts. The two belts are movable with respect to one another during the cyclic operation of the machine to permit the insertion of a form between the two belts without mutilating the glove and the subsequent stripping of the glove from the form.

The object of the present invention is to achieve certain improvements in the machine described in my prior patent.

According to one of the features of the present invention, the two belts above referred to are provided with extensions so as to convey the gloves from the stripping position to a desired discharge point after passing through a heated mangle or ironing position.

According to another feature of the invention, the forms on which the gloves are mounted can be readily attached to and removed from a rotating support, whereby various types of gloves may be pressed by the machine without requiring extensive alterations and the intervention of skilled mechanics.

The forms are electrically heated and are provided with contacts which allow ready connections with the power supply circuit when a form is put in place.

The forms and also preferably the heated irons are provided with a plurality of separate heating elements (preferably electrical) so that they may be heated to varying temperatures. The heating of the forms and the elements is controlled by suitably mounted switches.

These and other features of the invention will more clearly appear from the following detailed description of a preferred embodiment of the present invention and the appended claims.

Figure 1:
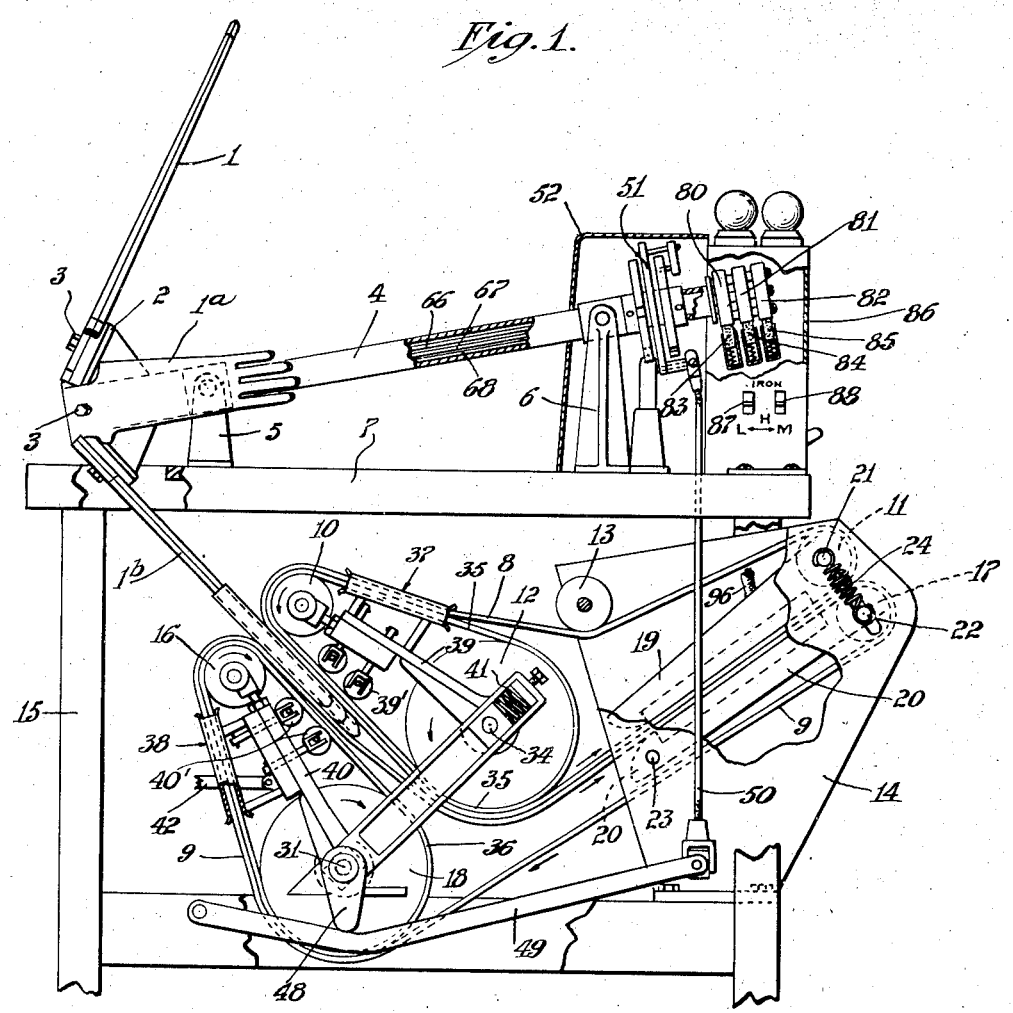

In the drawings, Fig. 1 is a side elevation of the machine with certain parts in section and others left out or broken away more clearly to illustrate the general plan and functioning of my machine.

Figure 2:
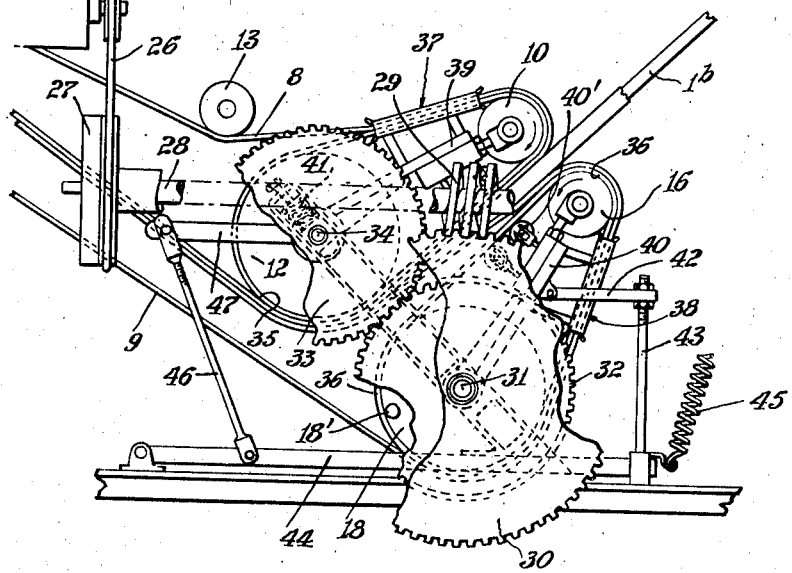

Fig. 2 is a side elevation of so much of the operating mechanism for controlling the cyclic movement of the machine as is necessary for a clear understanding of the invention.

Figure 3:
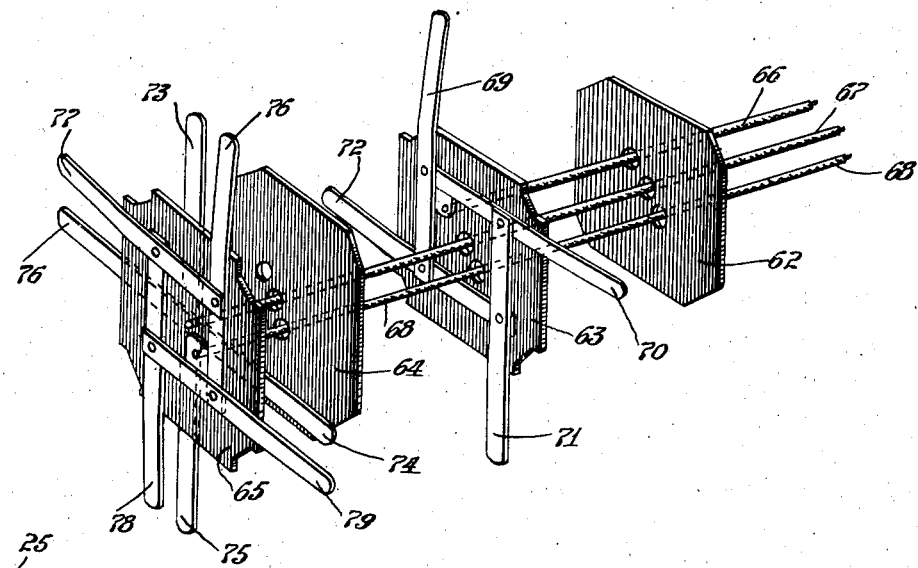

Fig. 3 is an exploded view of the contacts through which electrical connection is made to the forms, Fig. 4 is a plan view of said contacts in the assembled condition, Fig. 5 is a cross-section along lines 5—5 of Fig. 4, Fig. 6 is a top plan view of a form, Fig. 7 is a longitudinal cross-section partly in side elevation of the brushes in the electric circuit controlling the heating of the forms and irons, Fig. 8 is an end view of Fig. 7, and—

Figure 9:
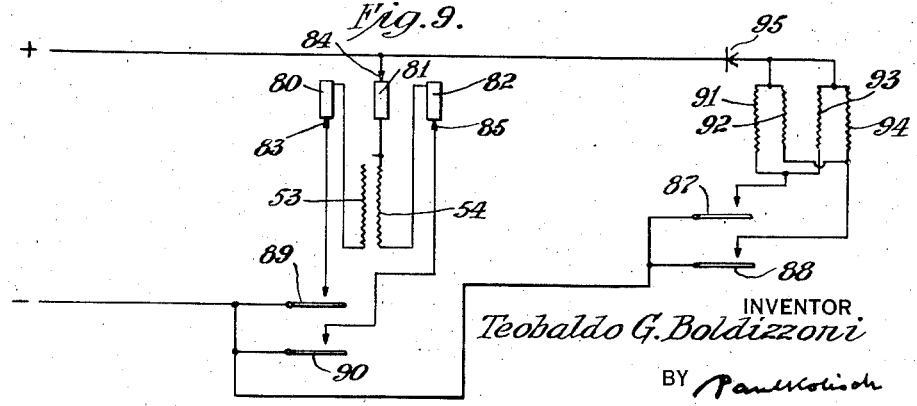

Fig. 9 is a diagrammatic illustration of the electric circuit for controlling the resistances in the forms and the irons.

Referring first to Fig. 1, four forms, only three of which 1, 1a and 1b, are shown in the drawings, are fastened to a spider 2 by means of bolts 3. The spider is mounted on and rotated by a hollow shaft 4 carried in brackets 5 and 6 on a table 7. As the shaft rotates, one form after the other is moved down through an opening in the table 7 between adjacent portions of two endless driven belts 8 and 9. Form 1b, with a glove mounted thereon, is shown as gripped between the two belts 8 and 9.

Belt 8 passes over a set of rollers comprising two small rollers 10 and 11 and an intermediate large roller 12. Bearing against the outside surface of the belt 8 is a roller 13 supported in a frame 14 in which roller 11 is also supported. The frame 14 is carried in a framework 15 on which the table 7 is mounted. The belt 9 is similarly mounted on a set consisting of two small rollers 16 and 17 and an intermediate large roller 18. The contacting portions of the two belts form a V at the bottom of which the large roller 12 is located. The belts contact with one another throughout their contiguous outer surfaces. By mechanism to be presently described, the portions of the belts extending between rollers 10, 12, 16 and 18, respectively, are moved back and forth with respect to one another so as to allow the entry of a form between the belts whereupon the belts are pressed together and, as they rotate, will strip the glove from the form and carry it until it emerges between the small rollers 11 and 17. The gloves travelling between the belts are ironed by means of irons 19 and 20 engaging opposite surfaces of belts 8 and 9 forming one leg of the V. The iron 19 is pivotally mounted on the stud 21 on which roller 11 is mounted in the frame 14. The other end of iron 19 rests by gravity on the inner surface of the belt 8. The lower iron 20 has one end fastened to the stud shaft 22 carrying lower roller 17 and the other end to a pin 23 in the frame 14. The shaft 22 is supported by a spring 24 from the shaft 21 whereby the two rollers 11 and 17 and therefore the outer ends of the irons 19 and 20 are permitted a limited relative movement with respect to one another when a glove passes between them.

The operating mechanism is substantially like the one illustrated in my above-mentioned patent and, therefore, only so much of it is shown in Figs. 1 and 2 as is necessary for an understanding of the invention. All of what is shown in Fig. 2 is mounted within the frame 15 of Fig. 1. Driving power for the machine is supplied from a motor 25 which through a belt 26 and a clutch 27 drives a shaft 28. The shaft 28 carries a worm 29 which drives a worm gear 30 fastened to shaft 31 on which the lower large roller 18 is supported. This shaft carries a gear 32 which meshes with a gear 33 fastened to shaft 34 on which the upper large roller 12 is supported. Through the gear 30 and the gears 32 and 33 the two rollers 18 and 12 are rotated and their rotation is transmitted to the small rollers 10 and 16 by means of two endless driving belts 35 and 36 encircling the two pairs of rollers. The belt 8 is placed on top of the belt 35, the two belts being held in position by means of a guide 37. Similarly, the belt 9 is placed on top of the belt 36 and the belts are held in position by means of guides 37 and 38.

The roller 10 is supported by a frame 39, oscillatably mounted on support 34 of roller 12, and the roller 16 on a frame 40, which is oscillatable about 31. Limited relative movement between the rollers 18 and 12 is insured by means of a spring 41 to permit slight displacement of these rollers when a glove passes between them.

A cyclic reciprocating movement between the two rollers 10 and 16 is controlled by the means fully disclosed in my prior patent. Of this means I illustrate here only an arm 42 pivoted to the frame 40 and connected by a rod 43 with a pivoted lever 44. Lever 44 is pulled upward at its free end by a coiled spring 45 and may be moved against the tension of the spring by means of an arm 46 actuated by a crank 47 which in turn is controlled by suitable cams (not shown) which are periodically actuated during the rotation of the machine. Similarly, a cam 18' on roller 18 actuates levers (not shown) to control the machine and cam 48 (Fig. 1) provided on the shaft 31, actuates a pivoted lever 49 which through a rod 50 and suitable gearing 51 provided within a housing 52 on the table 7 causes the cyclic rotation of the shaft 4. Thus it will be insured that the left hand portions of the belts 8 and 9 forming one leg of the V along which they contact, will separate to allow the insertion of a form between them and will then be pressed together to strip the glove from the form and move the glove to the delivery point past the rollers 11 and 17.

The arrangement of the belts 8 and 9 is such that the gloves mounted on the forms will be definitely gripped in succession as they are moved between the belts without deforming the gloves. The glove will then be removed from the form and will be carried between the belts and the rollers 12 and 18, which will strip and flatten them. The tautness of the belts in the left-hand leg of the V (Fig. 1) is insured by pressure rollers 39' and 40' mounted on frames 39 and 40 and engaging belts 35 and 36. The ironing operation is completed by the relatively long travel from the rollers 18 and 12 to the rollers 11 and 17 between the two irons 19 and 20. The irons may be heated to varying degrees depending on the character of the glove operated upon so that a dry and well-ironed glove will emerge from the rollers 11 and 17. These rollers are placed near the table top 7 to permit inspection by an operator sitting at the table and for convenient further handling of the gloves.

The speed of operation may be varied depending on requirements. Customarily it is such that one operator has time to place new gloves on the forms 1 as they come in the upright position.

Each of the forms, 1, 1a and 1b, consists of two parts and encloses two resistances 53 and 54 so distributed within the form as to heat and thus dry the glove placed thereon. The lower end of the form is perforated at 55 to allow the passage of the bolt 3 for the mounting of the arm on the spider 2. Below the opening 55, three contacts, 56, 57 and 58 project insulated from the casing of the forms which is of some good heat conducting material such as aluminum.

Electrical contact is made with the terminals 56, 57 and 58, of a form as an incident of the mounting thereof on the spider 2. This will now be described with the aid of Figs. 3, 4 and 5.

The spider is provided with a hub 59, which by means of a screw 60 may be fastened to the shaft 4, and with four inclined faces 61. Over the left hand end of the hub, as shown in Fig. 5, are stacked four sheets of insulating material 62, 63, 64 and 65, held in place by means of a cap 66' attached to the spider 2. The innermost insulator 62 has three holes through which conductors 66, 67 and 68 project into the hub 59 and therethrough into the hollow shaft 4.

Conductor 66 is conductively connected to a contact spring assembly riveted to the insulator 63. The assembly consists of leaf springs 69, 70, 71 and 72, having resilient ends projecting in four directions from the insulator 63. The bodies of these springs are, as above stated, riveted to the insulator 63 in electrical contact with one another and with the conductor 66.

On top of the spring assembly of insulator 63 is placed insulating disc 64 provided with perforations through which the conductors 67 and 68 project, which project also through perforations in the insulators 63. Conductor 67 is connected to four leaf springs, 73, 74, 75 and 76, mounted on one side of disc 65 and conductor 68 to four springs 76, 77, 78 and 79, mounted on the opposite side of disc 65. Each of these leaf spring assemblies is arranged like the one previously described except for lateral displacements of the springs of the various assemblies. As shown in Fig. 4, the three ends of the contact springs project in four directions from the stack, forming on each side a row of resilient contacts. Each row is substantially in alignment because the projecting contact ends are deformed to a variable extent. Thus one row of contact springs, 69, 73 and 76, projects above one slanting face 64 of the spider 2, a second row 70, 74 and 79 above a second face, contacts 71, 75 and 78 above the third face and contacts 72, 76 and 77 above the fourth face.

When a form 1 is fastened to a face 64 of the spider by means of the bolt 3, its terminals 56, 57 and 58 will engage and slightly depress the projecting ends of the contact springs 69, 73 and 76, thus establishing electrical connection with the conductors 66, 67 and 68. Similarly, when forms are fastened to the three other faces of the spider, connections will be established with the three conductors through the other three rows of contact springs.

The ends of the conductors 66, 67 and 68, are connected to commutators 80, 81 and 82 (Fig. 7), respectively, mounted on the end of shaft 4, but insulated therefrom and from one another. These commutators are each engaged by a spring-pressed brush 83, 84 and 85, the whole assembly being enclosed within a housing 86 (Fig. 1), provided on a table 7. On this housing 86, are mounted switches 87 and 88, by means of which electrical heating elements within the irons 19 and 20 may be controlled as well as switches (not shown) by means of which the heating elements 53 and 54 within the forms may be controlled. In Fig. 9, in which the circuit diagram is illustrated, the last-mentioned switches are indicated at 89 and 90 as are indicated the resistors 91, 92, provided in the upper and 93, 94, provided in the lower iron 20 together with a thermostatic cut-out switch 95.

One of the resistors in each form and iron, say 53, 91, 93, produces low heat when connected with a source indicated as +—, and the second resistor 54, 92 and 94, produces medium heat when connected in circuit. When both resistors are switched in, then the forms and the irons are subject to high temperature heating. The high, medium or low heating of the forms and irons is, as above stated, controlled by the switches 87, 88, 89 and 90. When switch 89 is closed then the low heating resistance 53 in every form connected with conductors 66, 67, 68, is connected from the negative pole of the current source through switch 89, brush 83, commutator 80, resistor 53, commutator 81, brush 84, to the positive pole of the current source. When switch 87 is closed, then the negative pole of the current source is connected over this switch and the resistors 91 and 93 in the irons 19 and 20 in parallel and thence to the positive pole over thermostat 95. When switch 90 is closed, then the negative pole is connected through this switch and thence brush 85, commutator 82, resistor 54, commutator 81, brush 84 to the positive pole. The negative pole may be connected through switch 88 with resistors 92 and 94 in parallel to the positive pole. When both switches 89 and 90 are closed, then both resistors 53 and 54 are connected in circuit and when both switches 76 and 88 are closed, then the four resistors, 91, 92, 93 and 94, are connected in parallel, producing high temperatures in the irons and the forms at the will of the operator.

The purpose of thermostat 95 is to cut the irons out of circuit when a pre-determined temperature is attained therein.

While I have disclosed a switching arrangement particularly suited for the purposes of the present invention, it will be obvious to those skilled in the art that many changes therein may be effected without departing from the spirit thereof. Similarly, it will be obvious to those skilled in the art that the operating mechanism and other details of the machine may be varied within wide limits.

What I claim is:

1. In a machine for pressing gloves, two belts, means for driving said belts in opposite directions in close proximity to one another, means for moving said belts over a part of their surfaces from and to one another, a plurality of forms, means for heating said forms, means for moving said forms over a path passing between the relatively movable parts of said belts, a mangle comprising two irons engaging said belts over another part of their surfaces, means for heating said irons, and a mounting for said irons arranged to allow for the passage of said belts and a glove between them.

2. In a machine for pressing gloves, two belts, means for driving said belts in opposite directions in close proximity to one another, means for moving said belts over a part of their surfaces from and to one another, a plurality of forms, means for heating said forms, means for rotating said forms over a path passing between the relatively movable parts of said belts, a mangle comprising two irons engaging said belts over another part of their surfaces, means for heating said irons, and a pivotal mounting for one end of one of said irons, the other end resting on one of said belts, and a fixed mounting for the other iron below the last-mentioned iron.

3. In a machine for pressing gloves, two sets of rollers, each set comprising two relatively small rollers and an intermediate relatively large roller, the rollers of corresponding size of the two sets being adjacent one another and the large rollers being below the level of the small rollers, a belt around the three rollers of each set, gears for driving the large rollers and with them the belts in opposite directions, the belts contacting with one another substantially throughout one-half their outside surfaces, means for moving the first small rollers of the sets from and to one-another, a plurality of forms, means for heating said forms, means for rotating said forms over a path passing between the first small rollers, a mangle comprising two irons engaging those portions of the belts which are between the large and the second small rollers, means for heating said irons, and a resilient mounting for said irons.

4. In a machine for pressing gloves, two sets of rollers, each set comprising two relatively small rollers and an intermediate relatively large roller, an endless belt around the large and the first small roller of each set, a second endless belt around the three rollers of each set outside the first-mentioned belts, gears for driving said belts in opposite directions, the second belts contacting with one another substantially throughout one-half their outside surfaces, means for moving the first small roller of each set and the belts mounted thereon from and to one another, a plurality of forms, means for heating said forms, means for rotating said forms over a path passing between the first small rollers, a mangle comprising two irons, one above the other with those portions of the second belts between them which are between the large and the second small rollers, means for heating said irons, pivotal mountings for one end of each of said irons, the other end of one iron being spring pressed against one of said belts and the other end of the other iron resting by gravity against the other belt.

5. In a machine for pressing gloves, a frame, two sets of rollers, each set comprising two relatively small rollers and an intermediate relatively large roller, supporting means on said frame for each large roller allowing a limited movement of said rollers with respect to one-another, members pivoted on said frame for supporting the first small roller of each set, said members being oscillatable about said pivots, a driving belt around the large and the first small roller of each set, a driven belt around the three rollers and the driving belt of each set, gears for driving the large rollers and with them said belts in opposite directions, the driven belts contacting with one another substantially throughout one-half of their outside surfaces forming a V at the base of which one of the large rollers is located, means for oscillating said members and moving with them the first small roller of each set and the belts mounted thereon from and to one-another, a plurality of forms, electrical means for heating said forms, a hollow shaft for rotating said forms over a path passing between the first small rollers, electrical connections for the form heating means passing through said shaft, a mangle comprising two irons, one above the other, with those portions of the driven belts between them which are between the large and the second small rollers, electrical means for heating said irons, pivotal mountings for one end of each of said irons, the other end of one iron being spring pressed against one of said belts and the other end of the other iron resting by gravity against the other belt.

6. In a glove form, a metal casing, two resistors in said casing, three contacts projecting from said casing insulated therefrom, one end of both resistors being connected with one of said contacts and the other ends of the two resistors being connected, respectively, with the second and the third contact, a spider, a plurality of sets of contacts, each consisting of three contact springs mounted on said spider, one spring in each contact set being connected to a spring in every other contact set, means for attaching a form to said spider with its contacts engaging one of said sets of contact springs, a source of current supply, and switching means for connecting one side of said source with the contact spring engaging the first contact and for selectively connecting the other side of the source with the contact springs engaging the second and third contacts.

7. In a glove form, a metal casing, two resistors in said casing, three contacts projecting from said casing insulated therefrom, one end of both resistors being connected with one of said contacts and the other ends of the two resistors being connected, respectively, with the second and third contacts, a spider having four sloping faces and a hollow hub, a plurality of sets of contact springs mounted on the hollow hub of the spider, each set consisting of a row of resilient contacts projecting above a sloping face of the spider, an electrical connection from one contact in each row to a certain contact in each of the other rows, insulation between all the other contacts, means for attaching a form to each sloping face with the contacts thereon engaging and depressing the row of contacts projecting above the face, and electrical conductors leading to said contacts through the hollow hub of the spider.

8. In a glove form, a metal casing, two resistors in said casing, three contacts projecting from said casing insulated therefrom, one end of both resistors being connected with one of said contacts and the other ends of the two resistors being connected, respectively, with the second and third contacts, a first plate of insulating material, four contact springs attached to one face of said plate, one end of each spring attached to the plate and connected with one another and with the other end of each spring projecting from the plate in different directions, a second plate, a second and a third set of four contact springs attached, respectively, to the two faces of the second plate, one end of each spring of each set of springs inter-connected and the other end of each spring of each set of springs projecting from the second plate in four different directions, the springs of each set being so positioned that when said plates are superimposed on one another, then the contact springs projecting therefrom will form four rows of adjacent aligned resilient contact springs, a spider having four sloping faces and a hollow hub, said plates being mounted on the hollow hub of the spider and each row of aligned contacts projecting above a sloping face of the spider, means for attaching a form to each sloping face with the contacts thereon engaging and depressing the row of contacts projecting above the face and an electrical conductor leading to each set of four contact springs through the hollow hub of the spider.

TEOBALDO G. BOLDIZZONI.